US005596461A

United States Patent [19]
Stefansky

[11] Patent Number: 5,596,461
[45] Date of Patent: Jan. 21, 1997

[54] SPACE EFFICIENT HOUSING CONFIGURATION FOR A DISK DRIVE #7

[75] Inventor: F. Mark Stefansky, Longmont, Colo.

[73] Assignee: Seagate Technology, Inc., Scotts Valley, Calif.

[21] Appl. No.: 450,213

[22] Filed: May 25, 1995

[51] Int. Cl.⁶ .......................... G11B 17/02; G11B 33/00
[52] U.S. Cl. .................................... 360/97.01; 360/98.01
[58] Field of Search ............................. 360/97.01, 98.01, 360/98.07–99.01, 99.12, 104–106, 137; 369/75.1, 258, 272, 292

[56] References Cited

U.S. PATENT DOCUMENTS

| | | | |
|---|---|---|---|
| 5,025,335 | 6/1991 | Stefansky | 360/97.01 |
| 5,235,472 | 8/1993 | Smith | 360/60 |
| 5,396,384 | 3/1995 | Caldeira et al. | 360/98.01 |
| 5,412,522 | 5/1995 | Lockhart et al. | 360/97.01 |
| 5,414,574 | 5/1995 | Boutaghou et al. | 360/97.01 |
| 5,420,733 | 5/1995 | Knighton et al. | 360/97.01 |
| 5,488,523 | 1/1996 | Seaver et al. | 360/99.12 |

Primary Examiner—Jefferson Evans
Attorney, Agent, or Firm—Bill D. McCarthy; Edward P. Heller, III; Randall K. McCarthy

[57] ABSTRACT

A space efficient disk drive housing is described. The disk drive housing comprises a base member having a top, a bottom, and an outer perimeter having length and end portions of preselected dimensions and a cover element comprising a top surface and side walls depending downwardly from the top surface. The cover element has length and width dimensions corresponding to the dimensions of the length and end portions of the base member so that the cover element can be secured to the base member to form the housing. The cover element is provided with a first raised portion to provide a height dimension within the housing sufficient for topmost portions of a spindle motor and head stack assembly of a disk stack assembly of a disk drive. Remaining portions of the top surface of the cover element providing a continuous, single PCB support surface. A set of support posts is provided on the cover element of the disk drive housing. The support posts are used to mount the disk drive to a host computer. The spindle motor and head stack assembly are mounted to the base member. The removal of the support posts from the base housing element mounting the spindle motor and head stack assembly, as done in conventional disk drives, frees up space on the base to permit greater flexibility in the placement of mechanical components of the disk drive.

8 Claims, 3 Drawing Sheets

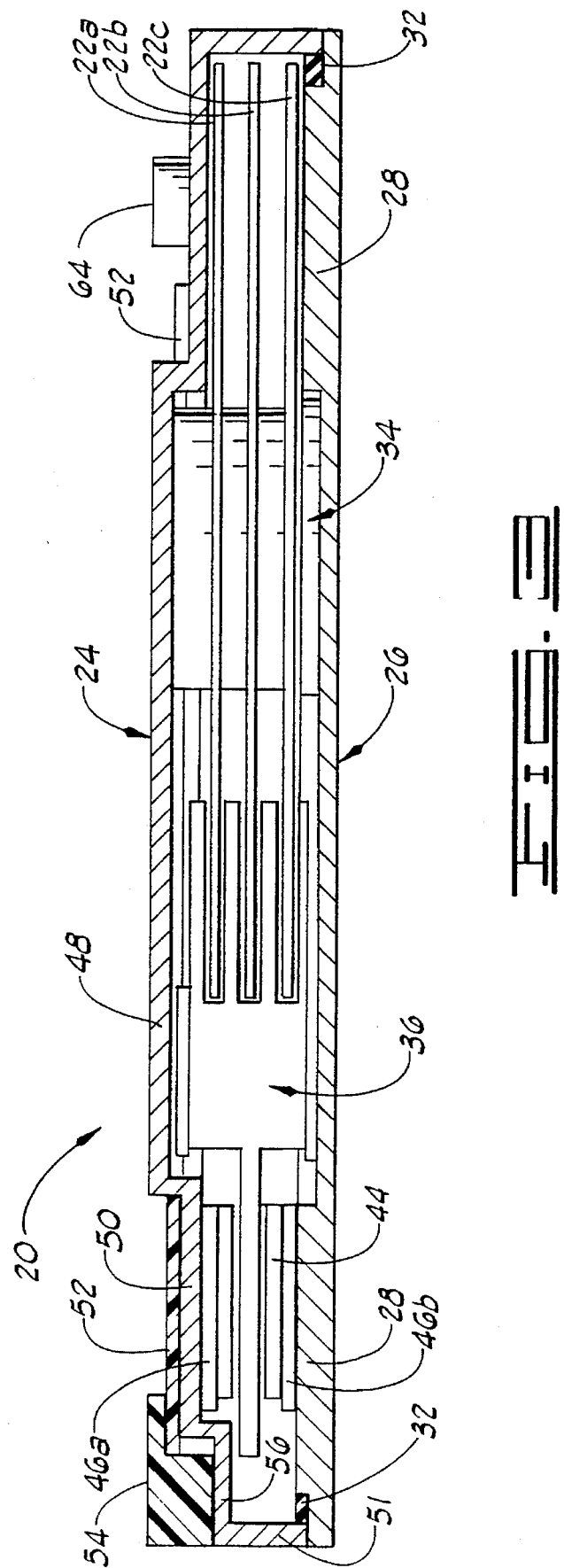

SPACE EFFICIENT HOUSING CONFIGURATION FOR A DISK DRIVE #7

FIELD OF THE INVENTION

The present invention is directed to disk drives. More particularly, the present invention provides a novel mechanical architecture for a disk drive housing. According to the architecture, the housing is configured in a manner that decreases the overall dimensions of the disk drive while accommodating the mounting of mechanical and electronic components required for operation of the disk drive.

BACKGROUND OF THE INVENTION

Disk drives are commonly used in workstations, personal computers, laptops and other computer systems to store large amounts of data in a form that can be made readily available to a user. In general, a disk drive comprises a magnetic disk that is rotated by a spindle motor. The surface of the disk is divided into a series of data tracks. The data tracks are spaced radially from one another across a band having an inner diameter and an outer diameter. Each of the data tracks extends generally circumferentially around the disk and can store data in the form of magnetic transitions within the radial extent of the track on the disk surface.

An interactive element, such as a magnetic transducer, is used to sense the magnetic transitions to read data, or to transmit an electric signal that causes a magnetic transition on the disk surface, to write data. The magnetic transducer includes a read/write gap that contains the active elements of the transducer at a position suitable for interaction with the magnetic surface of the disk.

As known in the art, the magnetic transducer is mounted by a head structure to a rotary actuator arm and is selectively positioned by the actuator arm over a preselected data track of the disk to either read data from or write data to the preselected data track of the disk, as the disk rotates below the transducer. The head structure includes a slider having an air bearing surface that causes the transducer to fly above the data tracks of the disk surface due to fluid currents caused by rotation of the disk.

In modern high capacity disk drives, the spindle motor is arranged to mount a stack of axially aligned storage disks, with the storage disks in the stack being spaced from one another. The use of multiple disks increases the total disk surface available for the storage of data. A head stack assembly comprises a stack of actuator arms, each mounting a head or a pair of heads. The stack of actuator arms is arranged adjacent the stack of storage disks with each head being positioned by the respective actuator arm over the surface of a corresponding one of the disk surfaces. The spacing between any two opposed disks of the stack is sufficient to accommodate the placement of an actuator arm between the two disks of the stack to position each of a pair of heads opposite the surface of a respective one of two opposing disks in the stack.

A complete assembly of the head stack assembly and the stack of disks is called a head disk assembly. Typically, the spindle motor and head stack assembly are mounted on a mounting surface of a base plate to form the head disk assembly. The spindle motor is mounted on the mounting surface at a location that is proximate one end of the base plate and the head stack assembly is mounted at a location proximate the other end of the base plate. A cover having a top and side portions extending downwardly from the top, is received over the spindle motor and head stack assembly, and is secured to the outer perimeter of the base plate to form a housing comprising the base plate and the top and side portions of the cover. In this manner, the housing encloses the spindle motor and head stack assembly of the head disk assembly in a protected environment.

The height of the head disk assembly, from the mounting surface of the base plate to the top most storage disk of the disk stack, must have a dimension that fits within the spacing between the base plate and the top of the cover. Typically, the extremities of the height dimension of each of the spindle motor and the head stack assembly exceed the extremities of the height dimension of the stack of disks. This is because the spindle motor mounts the disk or disks and has a greater height so that it can be mounted to the base plate at one end, and receive a clamp or other mechanical element at the other end, to secure the disk or disks to the spindle motor. In addition, the actuator structure must place an actuator arm/head assembly both above the top most disk surface and below the bottom most disk surface of the stack of disks to permit the reading and writing of data from these surfaces. Thus, the extremities of the spindle motor and head stack assembly dictate the overall height of the disk drive housing. In conventional disk drive products, the spacing between the top of the cover and the base plate is maintained at a dimension suitable to fit the entire head disk assembly, over substantially the entire width and length of the disk drive housing.

A disk drive product also includes various electrical connectors to couple the disk drive to a host computer (i.e. the computer that is using the disk drive to store data). The connectors include a host connector, to form electrical paths for the transmission of commands and data between the disk drive and the host computer, and a power connector, to connect the disk drive to the power supply of the computer to energize the motors and circuits within the disk drive.

A printed circuit board (PCB) is mounted on the side of the base plate opposite to the side mounting the head disk assembly. The PCB is used to mount control electronics for controlled operation of the spindle motor and actuator arm positioning. The PCB also includes read/write channel and disk controller circuitry coupled to the read/write heads, to control the transfer of data between the data tracks of the storage disks and the host connector. In a conventional disk drive, the PCB is generally rectangular in shape and has width and length dimensions that are approximately equal to the width and length dimensions of the base plate.

Moreover, a set of support posts is arranged to extend downwardly from the base plate for use in securely mounting the disk drive within the host computer.

The total height, width and length of the connectors, base plate, PCB and cover of the disk drive must fit within a mounting space provided in the host computer. Thus, the smaller the overall dimensions of the disk drive, the less space required within the host computer to accommodate the drive. The trend in recent years has been to design and build disk drive products with high data storage capacities, but that are lightweight and compact in size to minimize the space requirements and weight addition imposed on computer systems using the disk drives for data storage.

In one recent proposal, the overall dimensions of the disk drive are reduced by providing several PCB segments and mounting the PCB segments within cutout portions formed in the disk drive housing. The PCB segment approach takes advantage of miniaturization of integrated circuits to implement PCB structures in less than the full length and width dimensions of the disk drive. However, this arrangement incurs added power requirements for transmission of signals between PCB boundaries and does not fully realize economic use of available space.

SUMMARY OF THE INVENTION

The present invention provides a novel mechanical architecture for a disk drive housing that is based upon an efficiency in space utilization to accommodate the mounting of mechanical and electronic components of the disk drive in a minimum amount of volume. The present invention also recognizes and utilizes advances in integrated circuit miniaturization to configure PCB and housing elements in a manner that permits physical placement of disk drive components in a reduced amount of space.

In accordance with a feature of the present invention, a first raised portion of a housing element, such as a housing cover, is dimensioned to receive the top most portions of the spindle motor and actuator assembly, and includes a region that permits the movement of the top most actuator arm relative to a top disk surface. A second raised portion of the housing element, having a height dimension that is less than the height dimension of the first raised portion, is dimensioned to receive the top most disk(s) of a stack of disks.

A single PCB is arranged and configured to generally coincide with the surface area defined by the second raised portion. The PCB is mounted to the second raised portion, surrounds the first raised portion and has a height dimension that fits within the difference in height dimensions between the first and second raised portions. Advantage is taken of the miniaturization of integrated circuits to reduce the surface area of the PCB to within the surface area of the second raised portion. The first raised portion is configured to accommodate the height dimensions of the spindle motor and head stack assembly and occupies only as much space as required for this purpose. In this manner, the present invention makes a highly effective use of available space and eliminates the need to accommodate both the height of the spindle motor and head stack assembly and the mounting of a PCB to either a full side of a base plate or to be segmented into several portions arranged in various spaced recesses cut of housing surfaces.

In accordance with another feature of the present invention, a set of support posts is provided on a cover element of the disk drive housing. The spindle motor and head stack assembly are mounted to a base plate. The removal of the support posts from the base housing element mounting the spindle motor and head stack assembly, as done in conventional disk drives, frees up space on the base to permit greater flexibility in the placement of mechanical components of the disk drive.

BRIEF DESCRIPTION OF THE DRAWINGS

FIGS. 3 is a side cross sectional view of the disk drive of FIG. 2.

DETAILED DESCRIPTION

Figure 1:
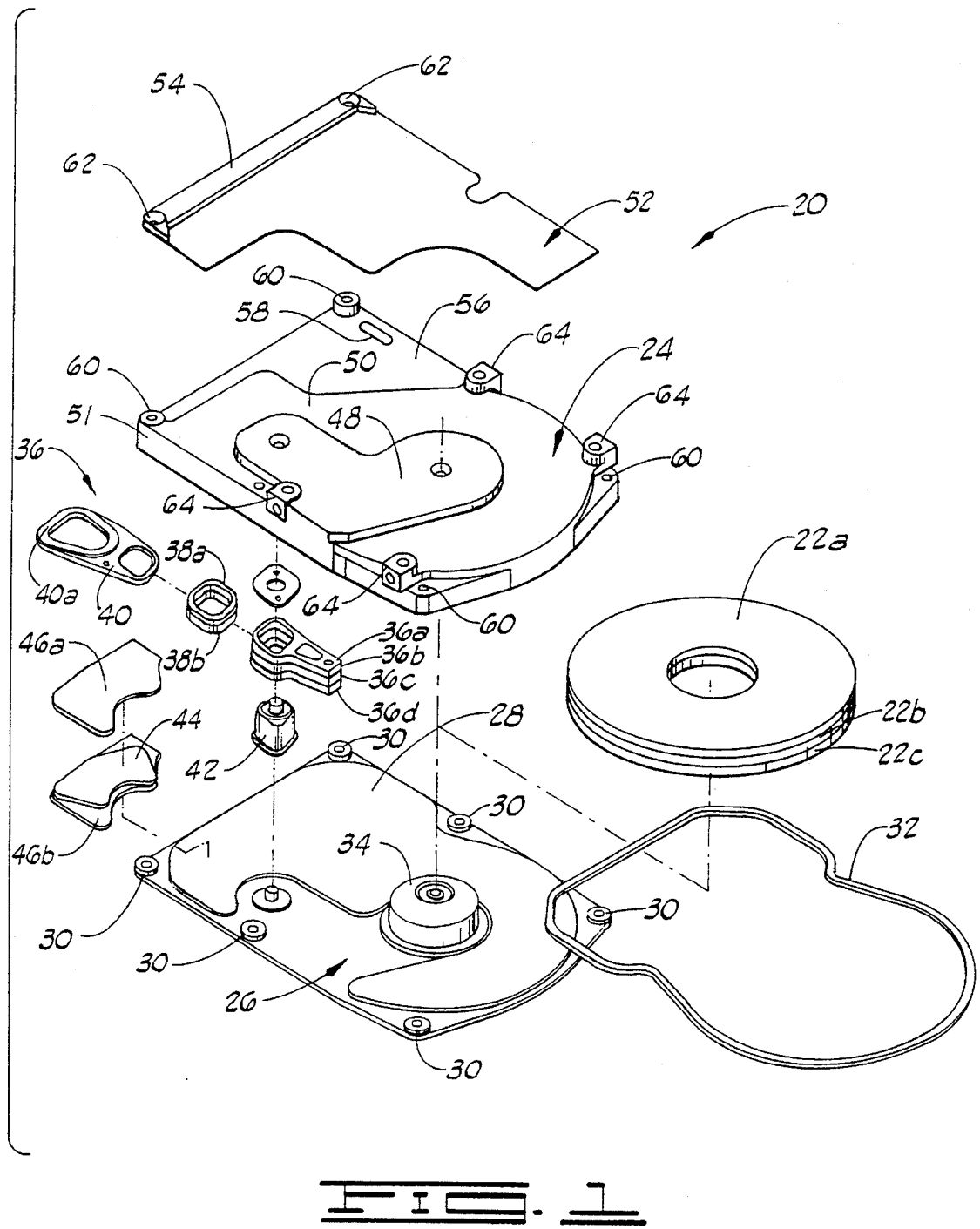
FIG. 1 a perspective, exploded view of a representative disk drive according to the present invention.

Referring now to the drawings, and initially to FIG. 1, there is illustrated an exemplary disk drive housing according to the present invention designated generally by the reference numeral 20. The disk drive housing 20 encloses a stack of storage disks 22a–c. Each of the storage disks 22a–c is provided with a plurality of data tracks (not shown) to store user data in the form of magnetic transitions, as is well known.

A housing comprises a cover element 24 and a base plate 26. The base plate 26 is formed to include a raised portion 28 that covers a substantial portion of the top surface area of the base plate 24. The raised portion 28 provides structural integrity and strength to the base plate 26. As clearly shown in FIG. 1, the raised portion 28 of the base plate 26 is shaped to accommodate the mounting of a head stack assembly 36, as will be described, the forming of internally threaded posts 30 to secure the cover element 24 to the base plate, and the placement of a gasket 32 to seal the housing when the cover element 24 is secured to the base plate 26.

A spindle motor 34 is mounted to the base plate 26 to support the disks 22a–c for rotation, as well known in the art. The principal components of the head stack assembly 36 comprise a stack of actuator arms 36a–d, spacers 38a,b and an electric coil element 40. Each actuator arm 36a–d is suitable to mount a head gimble assembly (not shown) for reading and writing data to and from the surfaces of the disks 22a–c, also as well known in the art. A rotatable shaft 42 is mounted to the base plate 26 and supports the actuator arms 36a–d, spacers 38a,b and electric coil element 40 in an alternating arrangement for rotation as a stack, such that the actuator arm 36a is rotatably positioned above the top surface of the disk 22a, the actuator arm 36b is spaced from the actuator arm 36a by the spacer 38a and rotatably positioned between the disks 22a and b, the actuator arm 36c is spaced from the actuator arm 36b by the electric coil element 40 and rotatably positioned between the disks 22b and c and the actuator arm 36d is spaced from the actuator arm 36c by the spacer 38b and rotatably positioned below the bottom surface of the disk 22c.

A permanent magnet 44 is secured between two mounting plates 46a,b, which are, in turn, mounted to the base plate 26, as shown in FIG. 1. An electric coil portion 40a of the electric coil element 40 is sandwiched between the mounting plates 46a,b when the electric coil element 40 is mounted on the rotatable shaft 42. In this manner, a control signal applied to the electric coil portion 40a can be used to control the radial position of the head stack, as is well known:

As shown in the exemplary embodiment of the present invention depicted in FIG. 1, the shape of the raised portion 28 in the vicinity of the head stack assembly 36 and the spindle motor 34 provides space just sufficient to receive the lower most portions of the spindle motor 34 and the rotatable shaft 42, as well as the bottom actuator arm 36d with suitable clearance for rotation through an arc sufficient to move the actuator arm 36d from an inner diameter of the bottom disk 22c to an outer diameter of the disk 22c containing data tracks.

According to the present invention, the cover element 24 is formed to include a top surface comprising a first raised portion 48 and a second raised portion 50. A side wall 51 depends downwardly for the top surface to define an enclosed space between the cover element 24 and base plate 26 when the cover element 24 is positioned on the base plate 26. The first raised portion 48 is formed to provide sufficient height, when the cover element 24 is secured to the base plate 26, to receive the topmost portions of the spindle motor 34 and head stack assembly 36 and to accommodate rotation of the top actuator arm 36a through an arc sufficient to move the actuator arm 36a from an inner diameter of the top disk 22a to an outer diameter of the disk 22a containing data tracks. As shown in the exemplary embodiment of the present invention depicted in FIG. 1, the shape of the raised portion 28 of the base plate 26 corresponds to the shape of the first raised portion 48 of the cover element 24 to provide a shaped region of the housing 20 with a total height dimension relative to the spindle motor 34 and head stack assembly 36, that is just sufficient for those elements.

The second raised portion 50 of the cover element 24 is shaped to provide a sufficient height dimension, when the cover element 24 is secured to the base plate 26, to receive the top disk 22a and the permanent magnet 44/mounting plate 46a,b assembly. As shown in FIG. 1, the raised portion 28 of the base plate 26 is formed to a shape that corresponds to the shape of the second raised portion 50 to provide a total height dimension relative to the disk stack and permanent magnet 44/mounting plate 46a,b assembly that is just sufficient for those elements.

A PCB 52 is provided to mount control electronics for controlled operation of the spindle motor 34 and the electric coil portion 40a. The PCB 52 is also used to mount read/write channel circuitry to control the transfer of data to and from the data tracks of the storage disks 22a–c. The control electronics and read/write channel circuitry as well as the manner for coupling these components to one another on the PCB 52 and to the various components of the disk drive are well known in the art.

The PCB 52 is also provided with a pin connector 54. The pin connector 54 is used to couple the disk drive electronics to a host computer (i.e. the computer that is using the disk drive to store data). The pin connector 54 includes a host connector, to form electrical paths for the transmission of commands and data between the disk drive and the host computer, and a power connector, to connect the disk drive to the power supply of the computer to energize the motors and circuits within the disk drive.

The PCB 52 is shaped to generally coincide with the shape of the second raised portion 50 such that the PCB 52 can be supported on the surface of the second raised portion 50 and surround the first raised portion when the PCB 52 is mounted to the disk drive housing 20. Moreover, the overall height of the PCB 52 is dimensioned to fit within the height difference between the first and second raised portions 48, 50. In this manner, a highly efficient use of space is achieved by providing housing height dimensions that precisely coincide with the height requirements of various components of the disk drive.

A portion 56 of the top surface of the cover element 24 that is not occupied by either the first and second raised portions 48, 50 is used to receive the pin connector 54 and any connecting elements (not shown) on the PCB 52 used to couple the electronics on the PCB 52 to the head stack assembly 36. To that end, an opening 58 is formed in the portion 56 to run any wiring (not shown) that may be necessary to couple the PCB 52 to the head stack assembly 36 within the housing 20.

A set of openings 60 is formed along the outer perimeter of the cover element 24 at positions that are aligned with the internally threaded posts 30 of the base plate 26 when the cover element 24 is placed onto the base plate 26. Screws (not shown) can be used to secure the cover element 24 to the base plate 26 via the aligned opening, internally threaded post arrangement.

In accordance with another feature of the present invention, openings 62 are formed in the pin connector 54. The openings 62 are arranged to align with corresponding openings 60 and internally threaded posts 30 of the cover element 24 and base plate 26, respectively, as shown in FIG. 1. The openings 62 permit the pin connector 54, and the attached PCB 52, to be secured to the disk drive housing 20 via screws received through the openings 62 and the corresponding openings 60, and threaded into the corresponding posts 30. In conventional disk drives, the connectors are typically mounted to the PCB, and do not have a secure mounting directly to the housing as provided by this feature of the present invention.

Pursuant to the present invention, a set of support posts 64 is formed at the outer perimeter of the cover element 24 for use in mounting the disk drive in a host computer. When installed in a host computer, the disk drive housing 20 is positioned so that the support posts 64 align with corresponding openings formed in the host computer. The support posts 64 include internally threaded openings to receive screws applied through the host computer openings. In conventional disk drives, the support posts are formed on the base plate and occupy space within the regions of the base plate where the spindle motor and head stack assembly are located. By moving the support posts 64 to the housing element (e.g. the cover element 24 in the exemplary embodiment of the present invention) opposite to the mounting element for the spindle motor and head stack assembly (e.g. the base plate 26 in the exemplary embodiment of the present invention), more space is available for mounting disk stack assembly components. The additional space availability can be used to increase flexibility in design configurations for the disk stack assembly.

Figure 2:
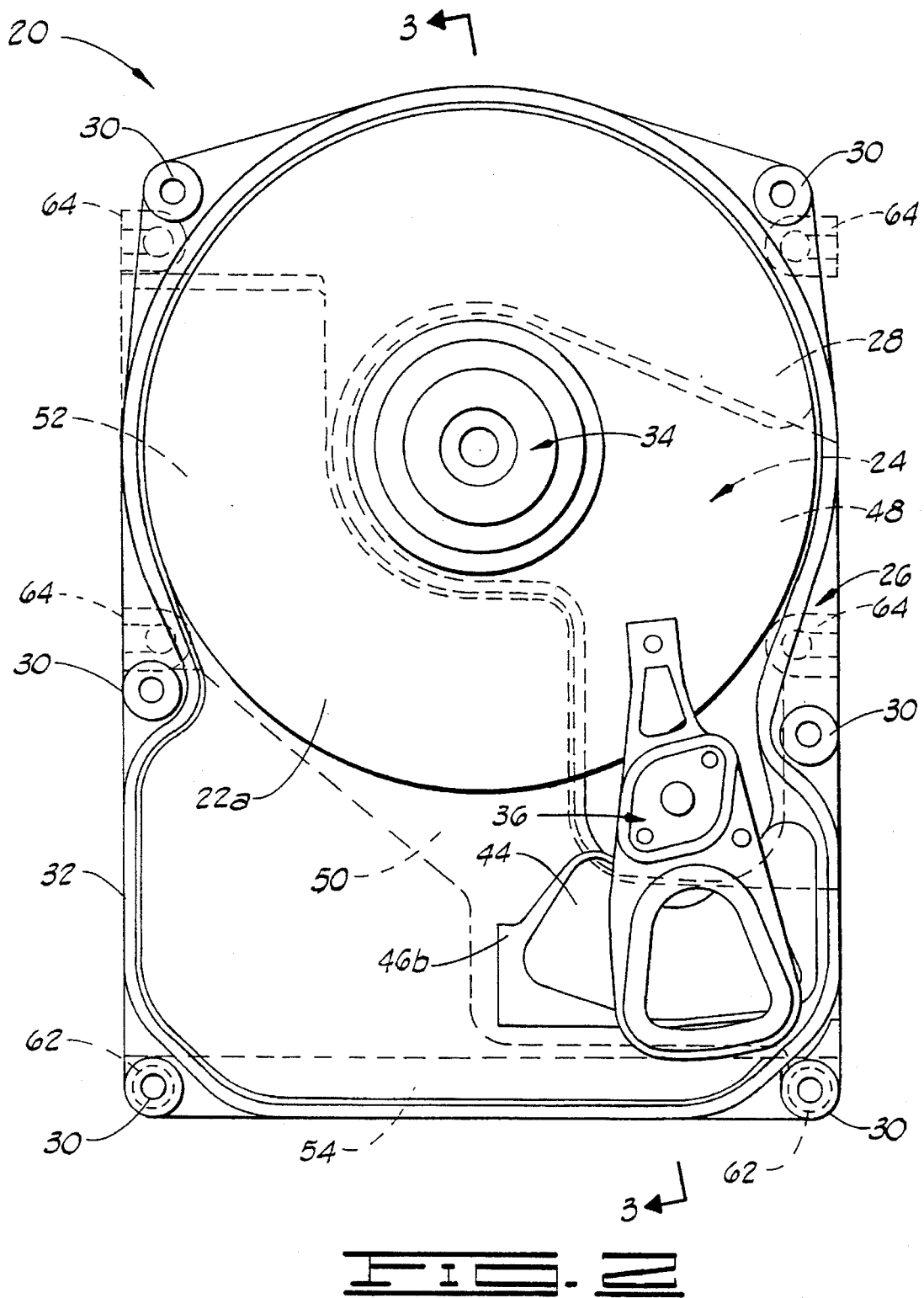
FIG. 2 is a top view of the disk drive of FIG. 1, with the cover shown as being transparent to illustrate the structural features of the present invention.

FIGS. 2 and 3 provide additional views of the exemplary disk drive housing embodying an example of the present invention. It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A disk drive housing, comprising:

a base member having a top, a bottom, and an outer perimeter having length and end portions of preselected dimensions; and a cover element comprising a top surface and side walls depending downwardly from the top surface, the cover element having length and width dimensions corresponding to the dimensions of the length and end portions of the base member;

the cover element being received onto and secured to the base member to form the housing;

the top surface of the cover element including a first raised portion to provide a height dimension within the housing sufficient for topmost portions of a spindle motor and head stack assembly of a disk stack assembly;

remaining portions of the top surface of the cover element being generally parallel to said first raised portion and providing a continuous, single PCB support surface.

2. The disk drive housing of claim 1 wherein the remaining portions of the top surface include a second raised portion to provide a height dimension within the housing sufficient for topmost portions of a stack of disks of the disk stack assembly, the first raised portion being higher than the second raised portion.

3. The disk drive housing of claim 2, wherein the cover element and base member further comprise aligned openings usable to secure the cover element to the base member to form the housing, and wherein the disk drive housing further comprises a PCB including an attached connector, the connector including openings aligned with at least certain ones of the openings of the base member and cover element for mounting the connector directly to the top surface of the cover element when the openings of the base member and cover element are used to secure the base member to the cover element.

4. The disc drive housing of claim 3, wherein the PCB is mounted over at least selected portions of the second raised portion of the top surface of the cover element.

5. The disk drive housing of claim 1 wherein the first raised portion of the top surface has a preselected shape and the base member includes a raised portion defining a recess aligned with the first raised portion and having a shape corresponding to the preselected shape of the first raised portion to provide a total height dimension within the housing sufficient for the height of the spindle motor and head stack assembly of the disk stack assembly.

6. A disk drive housing, comprising:

a base member having a top, a bottom, and an outer perimeter having length and end portions of preselected dimensions; and a cover element comprising a top surface and side walls depending downwardly from the top surface, the cover element having length and width dimensions corresponding to the dimensions of the length and end portions of the base member;

the cover element being received onto and secured to the base member to form the housing;

the top surface of the cover element including a first raised portion having a preselected shape to provide a height dimension within the housing sufficient for topmost portions of a spindle motor and head stack assembly of a disk stack assembly, the shape of the first raised portion being just sufficient to provide adequate height for the spindle motor and head stack assembly of the disk stack assembly, remaining portions of the top surface of the cover element being generally parallel to said first raised portion and providing a continuous, single PCB support surface.

7. The disk drive housing of claim 6 wherein the base member includes a raised portion defining a recess aligned with the first raised portion and having a shape corresponding to the preselected shape of the first raised portion to provide a total height dimension within the housing just sufficient for the height of the spindle motor and head stack assembly of the disk stack assembly.

8. The disc drive housing of claim 6, wherein the cover element further includes a set of support posts usable to mount the disk drive housing in a host computer.

* * * * *

UNITED STATES PATENT AND TRADEMARK OFFICE
CERTIFICATE OF CORRECTION

PATENT NO. : 5,596,461
DATED : January 21, 1997
INVENTOR(S) : F. Mark Stefansky

It is certified that error appears in the above-indentified patent and that said Letters Patent is hereby corrected as shown below:

Title page, column 1, line 2, after the word DRIVE, delete "#7"

column 1, line 2, after the word DRIVE, delete "#7"

Signed and Sealed this

Thirteenth Day of May, 1997

Attest:

BRUCE LEHMAN

Attesting Officer

Commissioner of Patents and Trademarks